United States Patent
Draluk et al.

(10) Patent No.: US 8,806,610 B2
(45) Date of Patent: Aug. 12, 2014

(54) MULTILEVEL PASSCODE AUTHENTICATION

(75) Inventors: Vadim Draluk, Cupertino, CA (US); Francois Goldfain, Sunnyvale, CA (US); Jan-Willem Maarse, Palo Alto, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 13/362,523

(22) Filed: Jan. 31, 2012

(65) Prior Publication Data

US 2013/0198832 A1 Aug. 1, 2013

(51) Int. Cl.
*G06F 21/00* (2013.01)

(52) U.S. Cl.
USPC .......................................................... 726/16

(58) Field of Classification Search
CPC ..... G06F 21/6218; G06F 21/53; G06F 21/31; G06F 21/83; G06F 2221/2105
USPC ................................. 726/16, 22–25; 713/182
See application file for complete search history.

(56) References Cited

U.S. PATENT DOCUMENTS

| | | | | |
|---|---|---|---|---|
| 7,636,853 B2* | 12/2009 | Cluts et al. | .................... | 713/186 |
| 7,664,962 B2* | 2/2010 | Kuhlman | ...................... | 713/186 |
| 7,690,032 B1* | 3/2010 | Peirce | ................................ | 726/9 |
| 7,864,987 B2* | 1/2011 | Venkatanna et al. | .......... | 382/115 |
| 8,085,992 B1* | 12/2011 | Sahin et al. | .................... | 382/115 |
| 8,095,672 B1* | 1/2012 | Newstadt et al. | ............. | 709/229 |
| 8,635,662 B2* | 1/2014 | Lang | ................................. | 726/1 |
| 2004/0044627 A1* | 3/2004 | Russell et al. | .................. | 705/50 |
| 2004/0083394 A1* | 4/2004 | Brebner et al. | ............... | 713/202 |
| 2004/0086157 A1* | 5/2004 | Sukegawa | ..................... | 382/115 |
| 2005/0129291 A1* | 6/2005 | Boshra | .......................... | 382/124 |
| 2006/0215886 A1* | 9/2006 | Black | ............................. | 382/124 |
| 2007/0241861 A1* | 10/2007 | Venkatanna et al. | ......... | 340/5.52 |
| 2008/0040780 A1* | 2/2008 | Reinhold | ............................ | 726/5 |
| 2008/0319872 A1* | 12/2008 | Russell et al. | .................. | 705/26 |
| 2008/0319906 A1* | 12/2008 | Russell et al. | .................. | 705/44 |
| 2008/0319907 A1* | 12/2008 | Russell et al. | .................. | 705/44 |
| 2009/0276823 A1* | 11/2009 | Vogler et al. | ....................... | 726/1 |
| 2010/0133338 A1* | 6/2010 | Brown et al. | ................. | 235/382 |
| 2010/0180127 A1* | 7/2010 | Li et al. | ......................... | 713/186 |
| 2011/0099571 A1* | 4/2011 | Lucas | ............................. | 725/19 |
| 2011/0209214 A1* | 8/2011 | Simske et al. | .................. | 726/21 |
| 2011/0231911 A1* | 9/2011 | White et al. | ...................... | 726/7 |
| 2013/0198832 A1* | 8/2013 | Draluk et al. | .................... | 726/16 |

OTHER PUBLICATIONS

P. Jonathon Phillips, "An Introduction to Evaluating Biometric Systems," Feb. 2000, IEEE computer society, vol. 33 issue 2, pp. 56-63.*
Devi, G. U. et al., "Multilevel Encryption System using Graceful Codes", International Journal of Advanced Research in Computer Science and Software Engineering, vol. 2, Issue 3, Retrieved on the Internet: http://www.ijarcsse.com/docs/papers/March2012/volume_2_Issue_3/V2I30055.pdf, Mar. 2012, 3 pgs.
Zviran, M. et al., "A Comparison of Password Techniques for Multilevel Authentication Methods", The Computer Journal, vol. 36, No. 3, Retrieved on the Internet: http://comjnl.oxfordjournals.org/content/36/3/227.full.pdf, 1993, 11 pgs.

* cited by examiner

*Primary Examiner* — Jason K. Gee
*Assistant Examiner* — Sanchit Sarker
(74) *Attorney, Agent, or Firm* — Kwan & Olynick LLP

(57) ABSTRACT

Mechanisms are provided to efficiently and effectively authenticate a user of a device. Passcode information such as passwords, pins, and access codes are obtained along with biometric information to periodically authenticate a user of a device. A user identity confidence score may be generated and continually modified by using data such as passcode information, biometric information, and/or user physical interaction characteristics information. If the user identify confidence score falls beneath a particular threshold, additional user authentication information may be requested.

17 Claims, 5 Drawing Sheets

MULTILEVEL PASSCODE AUTHENTICATION

TECHNICAL FIELD

The present disclosure relates to multilevel passcode authentication.

DESCRIPTION OF RELATED ART

Many devices such as mobile devices require entry of a passcode such as a password, code sequence, or pin before a user can access the mobile device. The passcodes may be application level, platform/operating system level, or hardware read only memory (ROM) level. In some instances, devices may have a biometric scanner such as a fingerprint reader that will scan a fingerprint in addition to requiring a passcode. Some devices may use a camera to perform facial recognition prior to allowing user access. Still other systems require a password along with correct responses to a particular set of challenge questions.

Although passcode based authentication and available biometric based authentication systems are effective, they have limitations. For example, some biometric based authentication systems are not fully accurate and lead to many false positives and negatives. Passcodes similarly have limitations. Consequently, the techniques of the present invention provide improved mechanisms for authentication.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Figure 1:
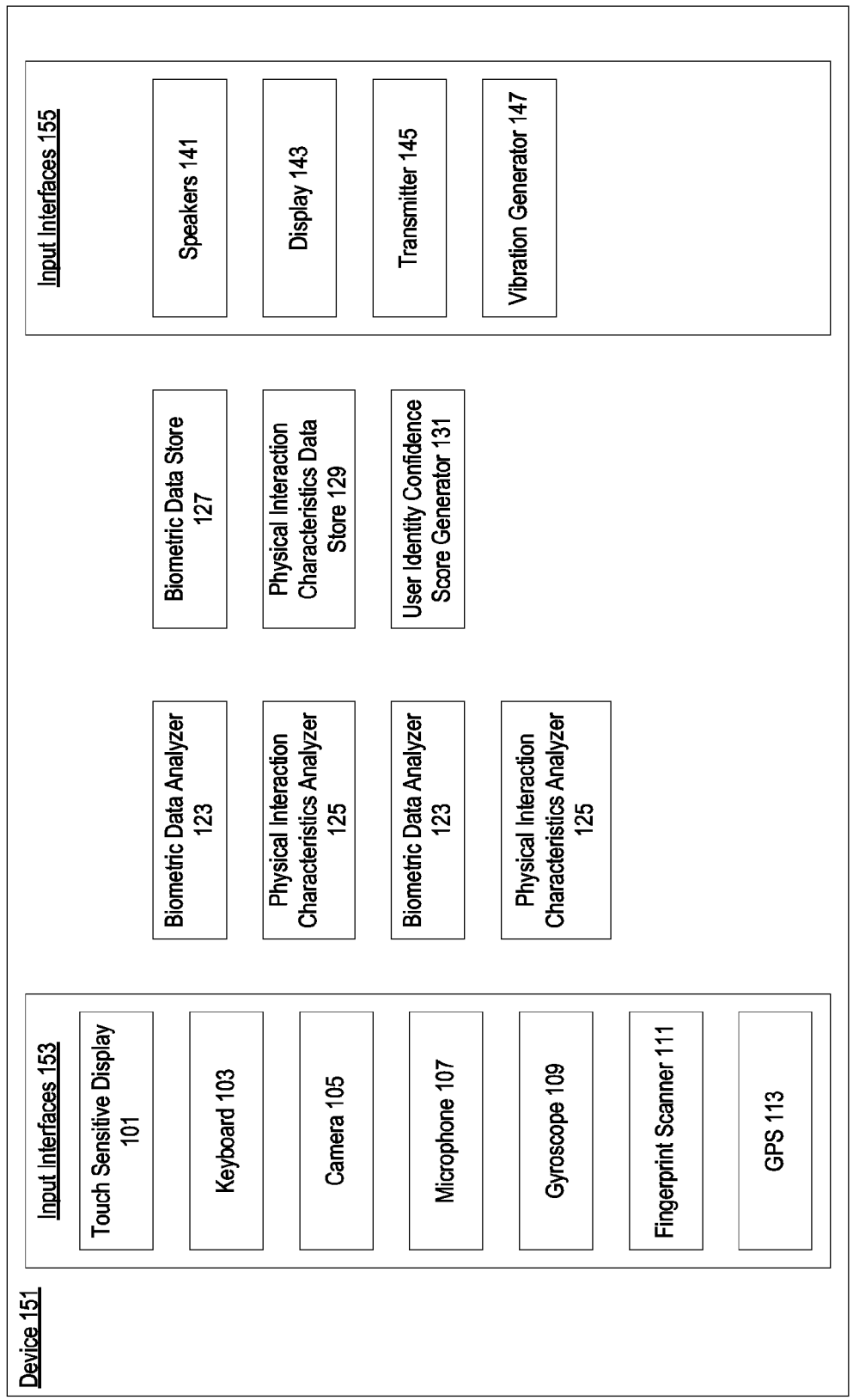
FIG. 1 illustrates a particular system for implementing multilevel passcode authentication.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular platforms and operating systems. However, it should be noted that the techniques and mechanisms of the present invention apply to a variety of different platforms and operating systems. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

OVERVIEW

Mechanisms are provided to efficiently and effectively authenticate a user of a device. Passcode information such as passwords, pins, and access codes are obtained along with biometric information to periodically authenticate a user of a device. A user identity confidence score may be generated and continually modified by using data such as passcode information, biometric information, and/or user physical interaction characteristics information. If the user identify confidence score falls beneath a particular threshold, additional user authentication information may be requested.

EXAMPLE EMBODIMENTS

Devices such as mobile devices often require different levels of authentication prior to allowing user access or continued access to the device or applications on the device. In some instances, authentication may be an application password received at a software application level. In other examples, authentication may involve an operating system or framework requesting fingerprint scan data, iris scan data, or facial recognition data before any operating system or framework functionality can be accessed. In still other examples, authentication information such as a password is requested during a boot sequence by a read only memory (ROM). A variety of levels of authentication are used. Some applications may require re-authentication after predetermined inactivity periods. Re-authentication typically includes a request for the same authentication information received previously.

Biometric mechanisms for authentication are effective but limited. In many instances, using biometric authentication alone leads to a number of false positives or negatives. Consequently, biometric authentication is often supplemented with passcode mechanisms. Passcode mechanisms are similarly effective but limited. Entering passcodes can be cumbersome, particularly on mobile devices because of limited input interface mechanisms. Some users will simplify mobile device related passcodes to allow ease of entry.

Consequently, techniques and mechanisms are provided to allow for multi-level authentication while enhancing security and user experience. According to various embodiments, the availability of reliable biometric information impacts the amount of passcode information required from the user. In particular embodiments, if biometric information can determine with high reliability the identity of the user, a passcode may not even be requested or may be requested less frequently. Alternatively, if biometric information is not as reliable, passcode information along with challenge questions responses may be required.

According to various embodiments, user characteristics information is used to supplement or augment biometric information. User characteristics information may include user physical interaction characteristics exhibited during usage of the device. For example, user physical interaction characteristics including how the user holds a device, what angle the device is held, how quickly the user taps, types, or swipes, how the user moves the device, etc., can all be used to identify a user with some degree of certainty. If user characteristics information consistently can verify the identity of the user with a high degree of certainty, passcode information may not be needed. According to various embodiments, user characteristics information includes user physical interaction characteristics information such as tapping and swiping speed, finger width, device viewing angle, etc. User characteristics information may also include time and location information not included in the group of user physical interaction characteristics as used herein.

Device usage characteristics may indicate that a mobile device is used at the same times every morning and email is accessed every two to three hours during the day. Similarly, it may be determined that a user typically operates from particular locations at particular times of day. Operating outside of those particular locations or time periods may indicate that additional authentication is needed. Additional authentication may involve only application level authentication, or may involve operating system level authentication and hardware level authentication as well. In some instances, the device generates a user identity confidence score that indicates how likely the user of a particular device is the owner of the device or an authorized user of the device. In some examples the user identity confidence score may be one or more values that indicate the likelihood a current user is an authorized user.

If the user identity confidence score is low based on available biometric data or user characteristics information, passcode information may be requested more frequently or additional authentication information on top of passcodes may be requested. According to various embodiments, if the user identity confidence score is high based on available biometric data or user characteristics information, passcode information may not be requested for an extended period of time. In particular embodiments, if the user identity confidence score is sufficiently high, passcode information is not requested for an extended period of time even when a device is resuming from standby or sleep mode.

According to various embodiments, the user identity confidence score provides a graduated scale for determining how frequently passcode information or additional authentication information is requested. Requesting passcode information less frequently may improve user experience while maintaining device security. In particular embodiments, if a user identity confidence score is low at a particular point, additional biometric information or additional user characteristics information may be obtained or requested.

FIG. 1 illustrates one particular example of a device that can use multilevel authentication. According to various embodiments, the device 151 may include multiple input interfaces 153 such as touch sensitive display 101, keyboard 103, camera, 105, microphone 107, gyroscope 109, fingerprint scanner 111, global positioning system (GPS) 113, etc. The input interfaces may be used to obtain passcode information such as passwords, pins, and pattern sequences as well as biometric information such as fingerprints, facial pattern scans, and iris scans. According to various embodiments, input interfaces may also be used to obtain user physical interaction characteristics information, such as swipe speed and length, device usage angle, application usage patterns, finger width, etc. In particular embodiments, it is recognized that user physical interaction characteristics such as tapping speed, swipe speed, finger width, device usage angle, hand temperature, and physical interaction characteristics, provide information about who may be using a particular device. Physical interaction characteristics information can be used along with biometric information and passcode information to further authenticate a user.

In particular embodiments, the device also includes a passcode store 121, a biometric data analyzer component 123, a physical interaction characteristics analyzer component 125, a biometric data store 127, and a physical interaction characteristics data store 129. According to various embodiments, the passcode store 121, biometric data store 127, and physical interaction characteristics data store 129 maintain passcodes, biometric data, and physical interaction characteristics data in encrypted form. Newly encrypted data may be compared to previously encrypted data maintained on the device. According to various embodiments, a user identity confidence score generator 131 aggregates scores from the biometric data analyzer component 123 and the physical interaction characteristics analyzer component 125 and identifies when passcode information was last obtained. If passcode information was entered fairly recently and biometric data and physical interaction data is consistent with the identified user, a high identity confidence score is maintained. According to various embodiments, even if significant time has elapsed since passcode information was last entered, as long as biometric data and physical interaction characteristics data is consistent with the identified user, passcode information may not be requested for an extended period of time.

In some examples, if a user identity confidence score is sufficiently high, a device may only request some biometric information instead of requesting user entry of a passcode. According to various embodiments, the device may also include output interfaces 155 such as speakers 141, display 143, transmitter 145, vibration generator 147, etc. The output interfaces can be used to request authentication information from the user.

Figure 2:
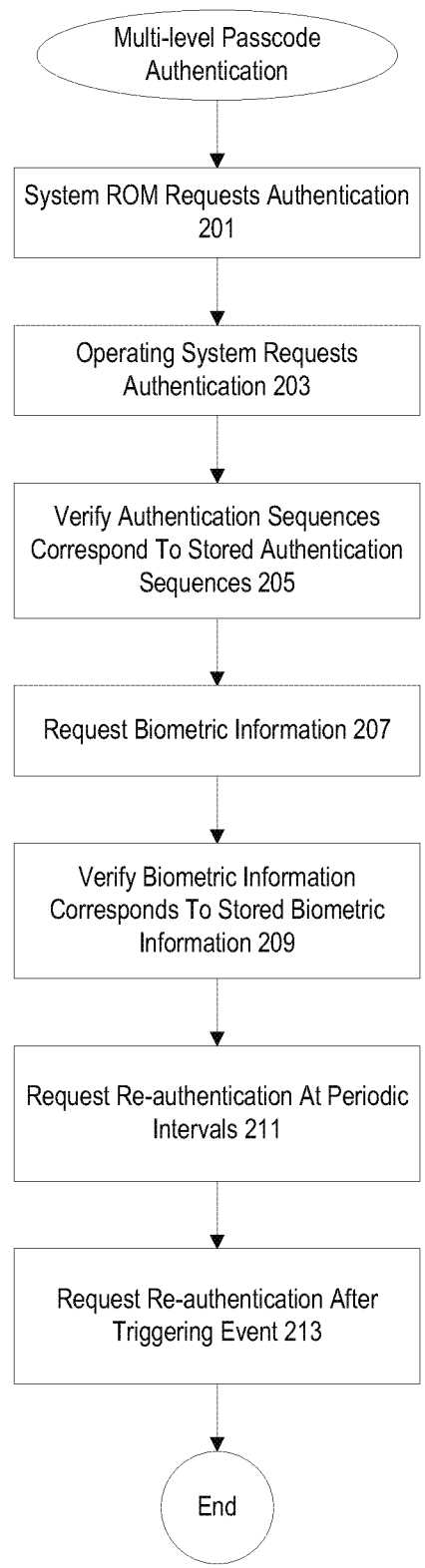
FIG. 2 illustrates a particular example of multilevel passcode authentication.

FIG. 2 illustrates one example of a technique for multilevel passcode authentication. At 201, a system ROM requests user authentication. The system ROM may request user authentication during an initial device boot sequence. According to various embodiments, an operating system requests user authentication including passcodes at 203. The ROM and/or operating system may verify that authentication sequences correspond with stored authentication sequences at 205. Otherwise, the user may not be allowed to proceed. User authentication may include passcodes such as passwords, pins, answers to verification questions, code sequences, etc. The operating system may also request user biometric information at 207. The device may verify that the biometric information corresponds with maintained biometric information at 209. At periodic intervals, the ROM, operating system, or even applications may request re-authentication at 211. According to various embodiments, the ROM, operating system, and applications may also request re-authentication after a particular triggering event at 213. The triggering event may be a device resuming from standby or sleep mode.

Figure 3:
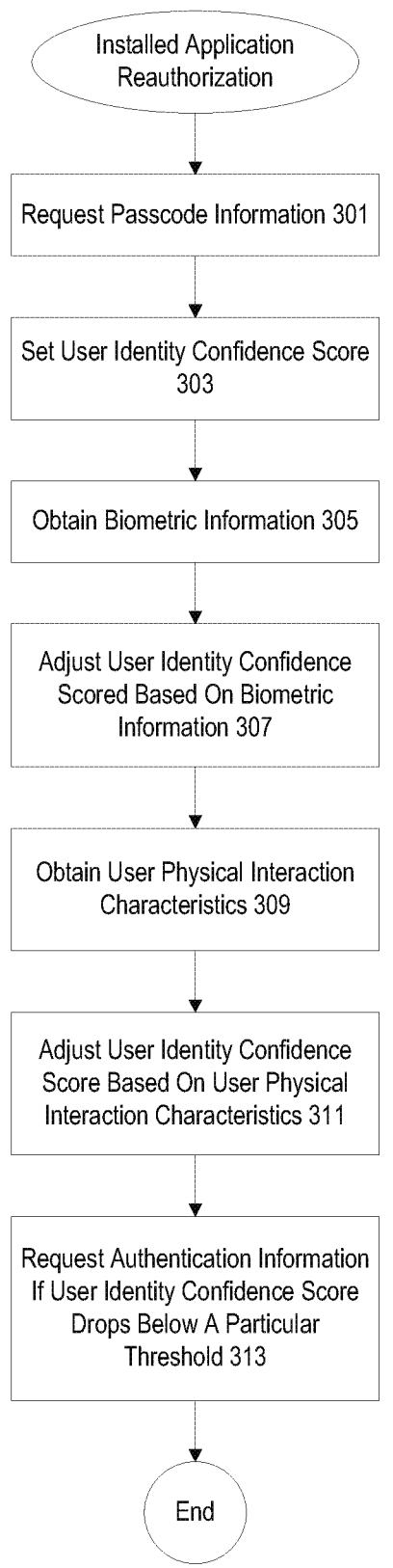
FIG. 3 illustrates a particular example multilevel passcode authentication using a user identity confidence score.

FIG. 3 illustrates one example of a technique for multi-level passcode authentication using a user identity confidence score. According to various embodiments, a system or operating system requests passcode information initially at 301. In particular embodiments, a user identity confidence score is set at 303. According to various embodiments, the user identity confidence score varies based on the strength of the password or errors made in password entry. Biometric information may also be obtained or continuously obtained at 305. Biometric information may raise or lower the identify confidence score at 307. In some instances, the user may not be verifiable based on biometric information, or biometric information may be very limited and not contribute much to maintaining a high user identity confidence score. According to various embodiments, user physical interaction characteristics are obtained or continuously obtained at 309. User physical interaction characteristics may include swipe speed, finger width, angle at which a device is typically held, etc. These physical interaction characteristics provide a signature that can help identify a particular user.

According to various embodiments, the user physical interaction characteristics may raise or lower the user identity confidence score at 311. According to various embodiments, if the user identity confidence score drops to a particular threshold, passcode information is requested or additional authentication information is obtained at 313. In particular embodiments, enter passcode information at this point may involve reentry of the same password or pin, responding to a challenge question, providing additional authentication information, entering a different password, etc. If the user identity confidence score remains sufficiently high or sufficient passcode information is entered, the use is provided access to one or more applications on the device. However, if the user identity confidence score is maintained above a confidence threshold, no additional authentication information may be required. In some examples, additional authentication information may include responses to challenge questions, password information, or pin information. As time passes after the last passcode entry, the user identity confidence score may continue to drop even if biometric information or physical interaction characteristics information is consistent with that of a user.

In other examples, a user may elect to set a device to not have to enter any passcode information unless biometric information or user device physical interaction characteristics are sufficiently incongruent with that of the user that a user identity confidence score drops below a confidence threshold. That is, passcode information and other authentication information such as a response to a challenge question may be requested only if biometric information and user physical interaction characteristics information are insufficient.

Figure 4:
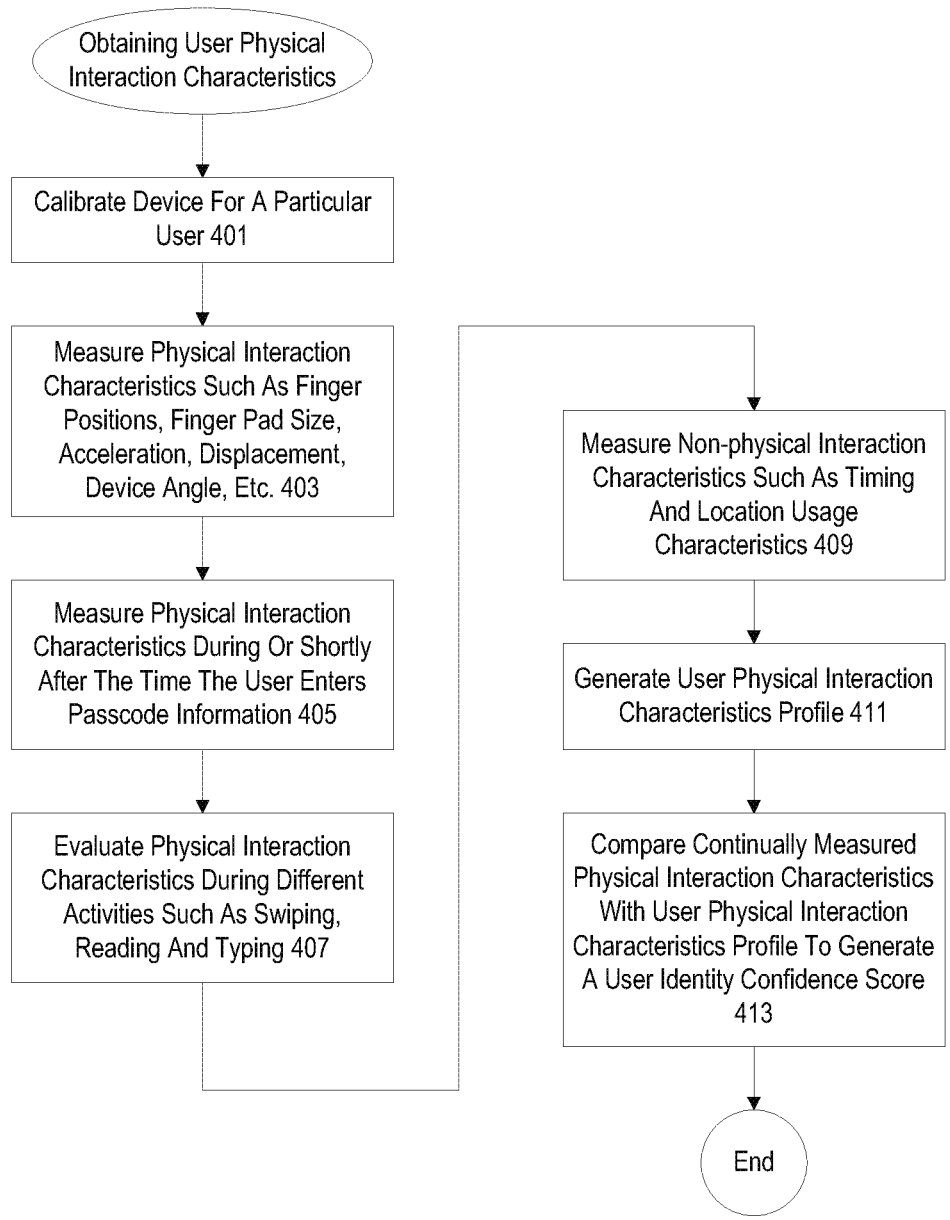
FIG. 4 illustrates a particular example of technique for user physical interaction characteristics identification.

FIG. 4 illustrates one example of a technique for obtaining user physical interaction characteristics. At 401, a device may be calibrated for the particular user. Capacitive sensors such as those on a touchscreen or touchpad detect any capacitance different from that of air. Capacitive sensors are sensitive to finger positions, finger pad sizes, moisture level, acceleration, displacement, changes in finger pad size during motion, etc. Individual users have fingers and finger motions that are distinctive for that individual, and possibly unique if measured to a sufficiently high level of precision. In particular embodiments, a device measures finger positions, finger pad sizes, moisture level, acceleration, displacement, and changes in finger pad size during motion while a device is being calibrated for a particular user at 403.

In particular embodiments, these physical interaction characteristics can also be measured while the user is entering a passcode or shortly after a passcode has been entered at 405. According to various embodiments, the angle at which a device is held is also measured during different activities such as swiping, reading, and typing at 407. In particular embodiments, non-physical interaction characteristics such as timing and location usage characteristics such as locations of use and time periods of use are also measured for the particular user at 409. According to various embodiments, physical interaction characteristics information is used to generate a user physical interaction characteristics profile at 411. Aspects of the user physical interaction characteristics profile can be used to evaluate user actions to determine a user identity confidence score at 413. In some examples, a user physical interaction characteristics profile is part of a more general user characteristics profile 415 that may include timing and location usage characteristics as well as user provided data.

Figure 5:
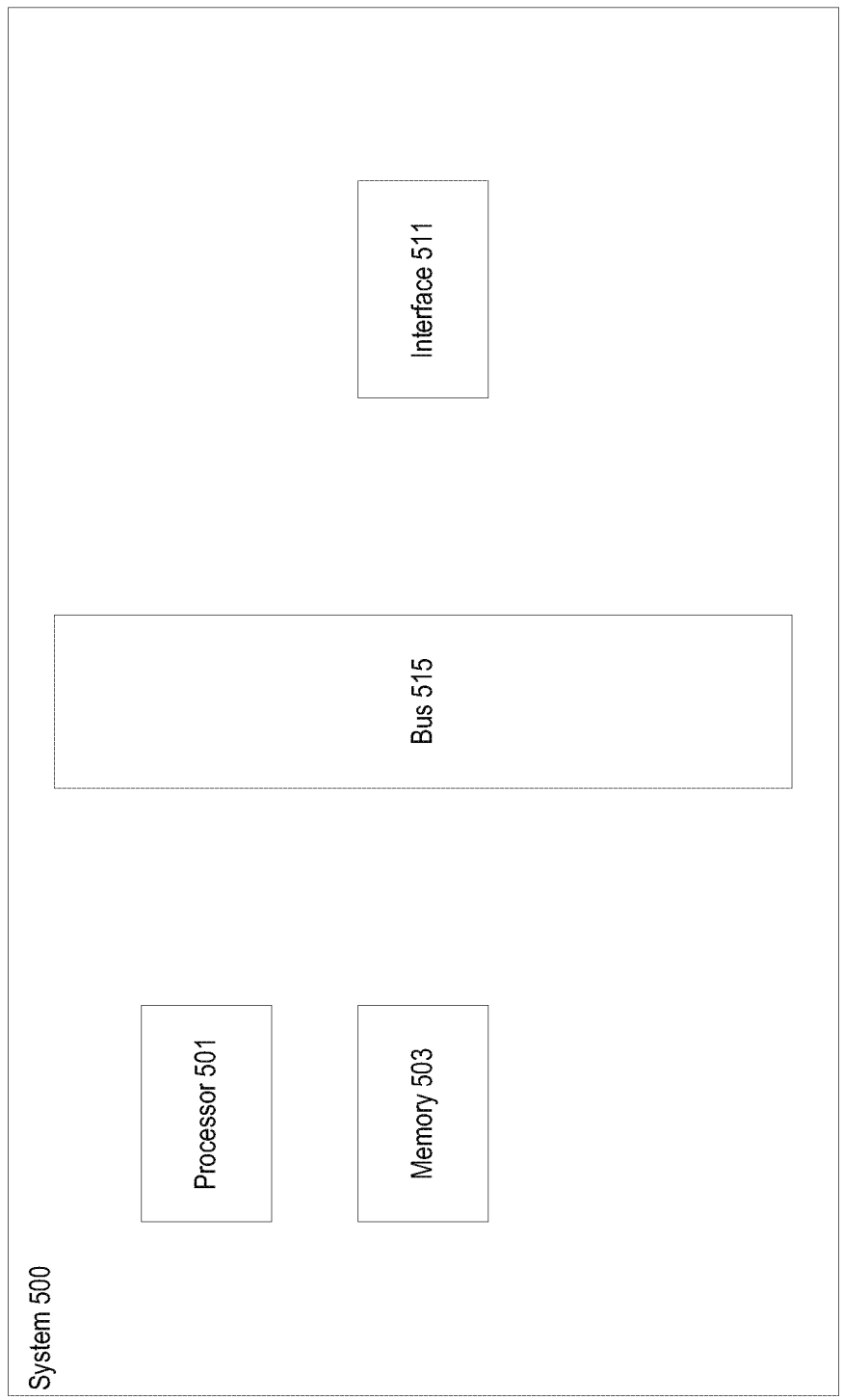
FIG. 5 illustrates a particular example of a computer system.

A variety of devices and applications can implement particular examples of the present invention. FIG. 5 illustrates one example of a computer system. According to particular example embodiments, a system 500 suitable for implementing particular embodiments of the present invention includes a processor 501, a memory 503, an interface 511, and a bus 515 (e.g., a PCI bus). When acting under the control of appropriate software or firmware, the processor 501 is responsible for such tasks such as optimization. Various specially configured devices can also be used in place of a processor 501 or in addition to processor 501. The complete implementation can also be done in custom hardware. The interface 511 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 500 uses memory 503 to store data and program instructions and maintain a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method, comprising:
    receiving user passcode information associated with a user and a device;
    obtaining biometric data corresponding to the user, the biometric data obtained using the device;
    generating and modifying a user identity confidence score using the biometric data, wherein the user identity confidence score is generated using the user passcode information and the biometric data and wherein the user identity confidence score is modified using biometric data and a length of time since passcode information was last entered, wherein the user identity confidence score drops as time passes after receiving user passcode information and continues to drop even if additional biometric data or user physical interaction characteristics information is consistent with that of the user;
    requesting entry of user passcode information when the user identity confidence score falls beneath a particular threshold.

2. The method of claim 1, wherein biometric information comprises facial recognition.

3. The method of claim 1, wherein biometric information comprises fingerprint data.

4. The method of claim 1, wherein biometric information comprises an iris scan.

5. The method of claim 1, wherein user passcode information comprises a password.

6. The method of claim 5, wherein user passcode information comprises a response to a challenge question.

7. The method of claim 1, further comprising providing the user with access to an application on the device.

8. The method of claim 1, wherein the user identity confidence score comprises a value indicating the likelihood that the user is an authorized user of the device.

9. A system, comprising:
    an interface configured to receive user passcode information associated with a user and a device;
    a biometric sensor configured to obtain biometric data corresponding to the user, the biometric data obtained using the device;
    a processor configured to generate and modify a user identity confidence score using the biometric data, wherein the user identity confidence score is generated using the user passcode information and the biometric data and wherein the user identity confidence score is modified using biometric data and a length of time since passcode information was last entered, wherein the user identity confidence score drops as time passes after receiving user passcode information and continues to drop even if additional biometric data or user physical interaction characteristics information is consistent with that of the user;
    wherein user passcode information is requested when the user identity confidence score falls beneath a particular threshold.

10. The system of claim 9, wherein the user identity confidence score is modified using physical interaction characteristics information.

11. The system of claim 10, wherein biometric information comprises facial recognition.

12. The system of claim 10, wherein biometric information comprises fingerprint data.

13. The system of claim 10, biometric information comprises an iris scan.

14. The system of claim 9, wherein user passcode information comprises a password.

15. The system of claim 14, wherein user passcode information comprises a response to a challenge question.

16. The system of claim 9, wherein the user is provided with access to an application on the device.

17. A non-transitory computer readable storage medium, comprising:
    computer code for receiving user passcode information associated with a user and a device;
    computer code for obtaining biometric data corresponding to the user, the biometric data obtained using the device;
    computer code for generating and modifying a user identity confidence score using the biometric data, wherein the user identity confidence score is generated using the user passcode information and the biometric data and wherein the user identity confidence score is modified using biometric data and a length of time since passcode information was last entered, wherein the user identity confidence score drops as time passes after receiving user passcode information and continues to drop even if additional biometric data or user physical interaction characteristics information is consistent with that of the user;
    computer code for requesting entry of user passcode information when the user identity confidence score falls beneath a particular threshold.

* * * * *